United States Patent
Smith et al.

(10) Patent No.: US 8,328,129 B2
(45) Date of Patent: Dec. 11, 2012

(54) VIBRATION-ATTENUATING HARD-MOUNTED PYLON

(75) Inventors: Michael R. Smith, Colleyville, TX (US); Frank B. Stamps, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 424 days.

(21) Appl. No.: 12/443,950

(22) PCT Filed: Oct. 12, 2006

(86) PCT No.: PCT/US2006/039992
§ 371 (c)(1),
(2), (4) Date: Apr. 1, 2009

(87) PCT Pub. No.: WO2008/045073
PCT Pub. Date: Apr. 17, 2008

(65) Prior Publication Data
US 2010/0090055 A1    Apr. 15, 2010

(51) Int. Cl.
*B64C 27/00* (2006.01)
(52) U.S. Cl. ............ 244/17.27; 244/54; 244/17.11
(58) Field of Classification Search .......... 244/17.27, 244/118.5, 118.6, 147
See application file for complete search history.

(56) References Cited

U.S. PATENT DOCUMENTS

| | | | |
|---|---|---|---|
| 3,477,665 A | | 11/1969 | Legrand |
| 3,514,054 A | | 5/1970 | Mard et al. |
| 3,638,885 A | * | 2/1972 | Reed .......................... 244/17.27 |
| 4,236,607 A | * | 12/1980 | Halwes et al. ................ 188/379 |
| 5,228,640 A | * | 7/1993 | Mouille ...................... 244/17.27 |
| 5,316,240 A | | 5/1994 | Girard et al. |
| 5,439,082 A | * | 8/1995 | McKeown et al. ............ 188/379 |
| 5,551,650 A | | 9/1996 | Southward et al. |
| 5,566,908 A | * | 10/1996 | Greenhalgh .............. 244/138 R |
| 5,732,905 A | | 3/1998 | Krysinski |

(Continued)

FOREIGN PATENT DOCUMENTS

CA    2546354 A1    11/2006
(Continued)

OTHER PUBLICATIONS

Halwes, Dennis R., Total Main Rotor Isolation System, American Helicopter Society Northeast Region National Specialist' Meeting on Helicopter Vibration, Nov. 1981, Hartford, Connecticut.

(Continued)

*Primary Examiner* — Christopher P Ellis
*Assistant Examiner* — Medhat Badawi
(74) *Attorney, Agent, or Firm* — James E. Walton; J. Oliver Williams

(57) ABSTRACT

A preferred embodiment of a pylon has six pylon mounting links for mounting the pylon to an airframe. Each link is considered "near-rigid" and has a spherical-bearing rod-end on both ends such that the link can only transmit axial loads. At least one of the links has a mass carried within the link and selectively moveable by an actuating means along the axis of the link in an oscillatory manner for attenuating vibrations traveling axially through the link. The actuating means may be an electromechanical, hydraulic, pneumatic, or piezoelectric system. By mounting each link in a selected orientation relative to the other links, the actuating means may be operated in a manner that attenuates axial vibration that would otherwise be transmitted through the link and into the airframe.

5 Claims, 7 Drawing Sheets

U.S. PATENT DOCUMENTS

| | | | |
|---|---|---|---|
| 5,806,803 A * | 9/1998 | Watts | 244/171.8 |
| 5,906,254 A | 5/1999 | Schmidt et al. | |
| 6,045,090 A | 4/2000 | Krysinski et al. | |
| 6,073,887 A * | 6/2000 | Hosick | 244/171.8 |
| 6,073,888 A * | 6/2000 | Gelon et al. | 244/171.8 |
| 6,695,106 B2 * | 2/2004 | Smith et al. | 188/378 |
| 6,769,644 B2 * | 8/2004 | Muylaert et al. | 244/17.11 |
| 6,851,529 B2 | 2/2005 | Jones et al. | |
| 7,490,792 B1 * | 2/2009 | Carter, Jr. | 244/17.27 |
| 7,631,835 B2 * | 12/2009 | Ferrer | 244/17.27 |
| 7,686,246 B2 * | 3/2010 | Badre-Alam et al. | 244/17.13 |
| 7,717,368 B2 * | 5/2010 | Yoeli | 244/23 D |
| 7,857,255 B2 * | 12/2010 | Pancotti et al. | 244/17.27 |
| 2001/0017334 A1 | 8/2001 | Vincent | |
| 2009/0321556 A1 * | 12/2009 | Pancotti et al. | 244/17.27 |

FOREIGN PATENT DOCUMENTS

| | | |
|---|---|---|
| JP | 7-81693 A | 3/1996 |

OTHER PUBLICATIONS

Halwes, Dennis R., Total Main Rotor Isolation System Analysis, NASA Contractor Report No. 165667, NASA Langley Research Center, Jun. 1981, Hampton, Virginia.

Halwes, Dennis R. and Nicks, Colby O., Six Degree-of-Freedom 'LIVE' Isolation System Tests, Part 1: Interim Report, NASA Contractor Report 177928, NASA Langley Research Center, Apr. 1986, Hampton, Virginia.

Halwes, Dennis R., Controlling the Dynamic Environment During NOE Flight, NATO AGARD Conference, Summer 1985.

Halwes, Dennis R., Ground and Flight Test Results of a Total Main Rotor Isolation System, NASA Contractor Report NAS1-16969, Jul. 1987.

Halwes, Dennis R., LIVE—Liquid Inertia Vibration Eliminator, American Helicopter Society 36th Annual Forum, May 1980, Washington, D.C.

McGuire, Dennis P., High Stiffness ("Rigid") Helicopter Pylon Vibration Isolation Systems, American Helicopter Society 59th Annual Forum, May 2003, Phoenix, Arizona.

Smith, Michael R. and Redinger, W. Scott, The Model 427 Pylon Isolation System, American Helicopter Society 55th Annual Forum, May 1999, Quebec, Canada.

International Search Report and Written Opinion in Parent Application PCT/US06/39992, dated Oct. 1, 2008.

International Search Report and Written Opinion in Parent Application PCT/US06/39992, dated Oct. 7, 2008, 7 pages.

International Preliminary Report on Patentability in Parent Application PCT/US06/39992, dated May 5, 2009, 4 pages.

Chinese First Office Action in related application CN 200680056093.3 issued by Chinese Patent Office on Feb. 9, 2011, 12 pages.

Second Examination Report in related application CA 2,665,700 issued by Canadian Intellectual Property Office on Apr. 30, 2012, 2 pages.

Chinese Second Office Action in related application CN 200680056093.3 issued by Chinese Patent Office on Jan. 31, 2012, 13 pages.

Chinese First Office Action in related application CN 200680056093.3 issued by Chinese Patent Office on Aug. 31, 2012, 14 pages.

* cited by examiner

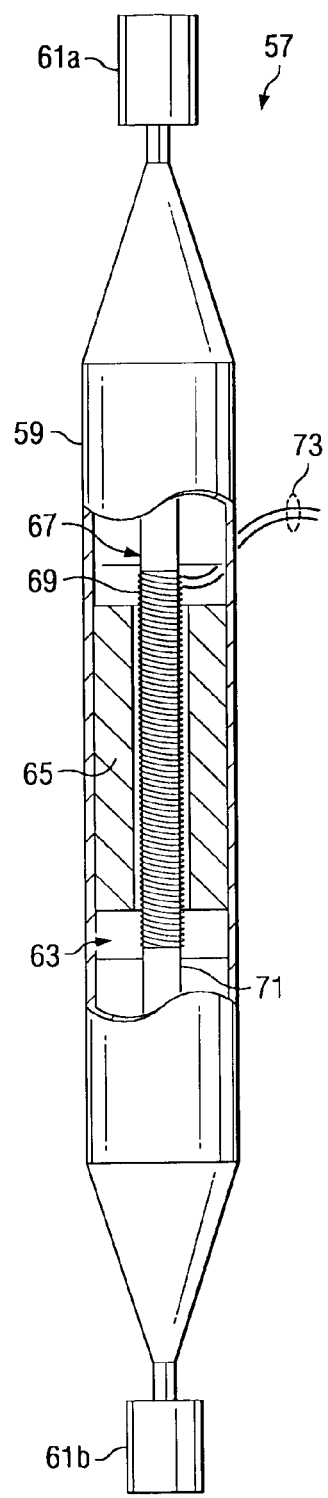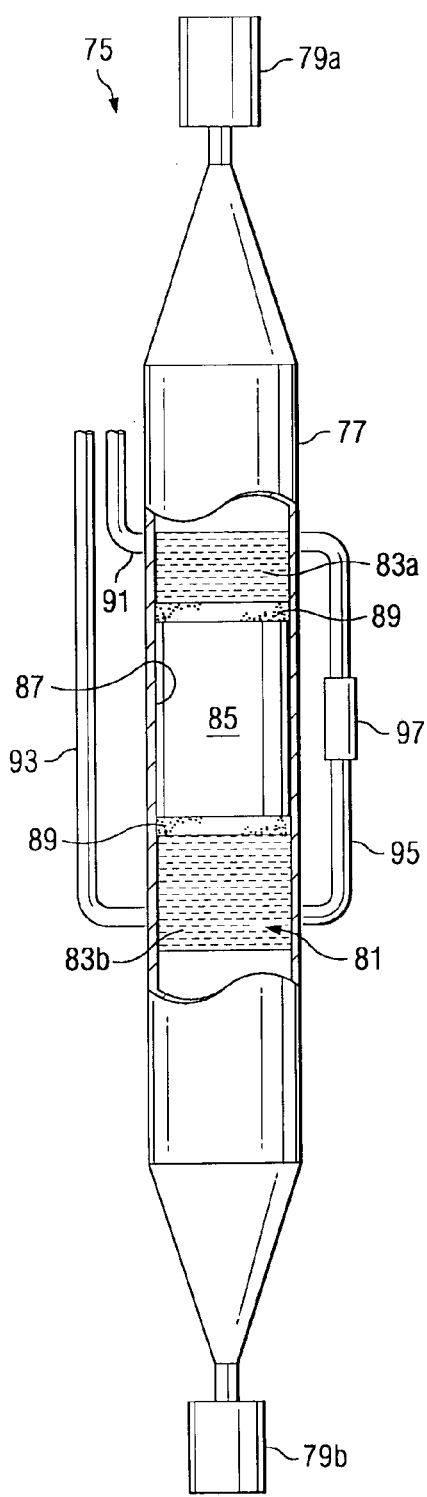
FIG. 6
FIG. 7

VIBRATION-ATTENUATING HARD-MOUNTED PYLON

TECHNICAL FIELD

The present invention relates generally to the field of active vibration control and relates particularly to active vibration control for aircraft.

DESCRIPTION OF THE PRIOR ART

For many years, effort has been directed toward the design of apparatus for isolating a vibrating body from transmitting its vibrations to another body. Such apparatus are useful in a variety of technical fields in which it is desirable to isolate the vibration of an oscillating or vibrating device, such as an engine, from the remainder of the structure. Typical vibration isolation and attenuation devices ("isolators") employ various combinations of the mechanical system elements (springs and mass) to adjust the frequency response characteristics of the overall system to achieve acceptable levels of vibration in the structures of interest in the system. One field in which these isolators find a great deal of use is in aircraft, wherein vibration-isolation systems are utilized to isolate the fuselage or other portions of an aircraft from mechanical vibrations, such as harmonic vibrations, which are associated with the propulsion system, and which arise from the engine, transmission, and propellers or rotors of the aircraft.

Vibration isolators are distinguishable from damping devices in the prior art that are erroneously referred to as "isolators." A simple force equation for vibration is set forth as follows:

$$F = m\ddot{x} + c\dot{x} + kx$$

A vibration isolator utilizes inertial forces $m\ddot{x}$ to cancel elastic forces $kx$. On the other hand, a damping device is concerned with utilizing dissipative effects $c\dot{x}$ to remove energy from a vibrating system.

One important engineering objective during the design of an aircraft vibration-isolation system is to minimize the length, weight, and overall size (including cross-section) of the isolation device. This is a primary objective of all engineering efforts relating to aircraft.

Another important engineering objective during the design of vibration-isolation systems is the conservation of the engineering resources that have been expended in the design of other aspects of the aircraft or in the vibration-isolation system. In other words, it is an important industry objective to make incremental improvements in the performance of vibration isolation systems which do not require radical re-engineering or complete redesign of all of the components which are present in the existing vibration-isolation systems.

A marked departure in the field of vibration isolation, particularly as applied to fixed- and rotary-wing aircraft is disclosed in commonly assigned U.S. Pat. No. 4,236,607, titled "Vibration Suppression System," issued Dec. 2, 1980, to Halwes, et al. (Halwes '607). Halwes '607 is incorporated herein by reference. Halwes '607 discloses a vibration isolator, in which a dense, low-viscosity fluid is used as the "tuning" mass to counterbalance oscillating forces transmitted through the isolator. This isolator employs the principle that the acceleration of an oscillating mass is 180 degrees out of phase with its displacement.

In Halwes '607, it was recognized that the inertial characteristics of a dense, low-viscosity fluid, combined with a hydraulic advantage resulting from a piston arrangement, could harness the out-of-phase acceleration to generate counterbalancing forces to attenuate or cancel vibration. Halwes '607 provided a much more compact, reliable, and efficient isolator than was provided in the prior art. The original dense, low-viscosity fluid contemplated by Halwes '607 was mercury.

Since Halwes' early invention, much of the effort in this area has been directed toward replacing mercury as a fluid or to varying the dynamic response of a single isolator to attenuate differing vibration modes. Examples of the latter are found in commonly assigned U.S. Pat. No. 5,439,082, titled "Hydraulic Inertial Vibration Isolator," to McKeown, et al. (McKeown '082), and U.S. Pat. No. 6,695,106, titled "Method and Apparatus for Improved Vibration Isolation," to Smith, et al (Smith '106). McKeown '082 and Smith '106 are incorporated herein by reference.

The Halwes vibration isolator, and similar isolators, provides particular utility in the application of vibration control for helicopters. In most current helicopters, the drive shaft (mast) and transmission are rigidly connected together in a unit referred to as a "pylon." The pylon is mounted to the airframe, and the engines are mounted to the airframe separate from the pylon assembly.

For example, FIG. 1 shows a prior-art configuration in which a pylon 11 comprises a transmission 13 mounted to an airframe 15. Transmission 13 is mounted using multiple links 17. An engine 19 is mounted to airframe 15 near pylon 11 using multiple links 21. A coupling 23 couples an output of engine 19 to a shaft 25, which is coupled with coupling 27 to an input of transmission 13. Torque produced by engine 19 is transmitted through shaft 25 into transmission 13 for driving in rotation mast 29. Mast 29 is coupled to at least one rotor (not shown) for causing rotation of the rotor. Links 17 are shown as having integral isolators 31, such as Halwes isolators, for isolating vibration transmitted through links 17 from pylon 11. Each end of each link 17 has a spherical-bearing rod end 33a, 33b for connecting links 17 to the mounting locations on transmission 13 and airframe 15, respectively.

The Halwes vibration isolator has been incorporated in a pylon mounting system providing six degrees of freedom for the pylon relative to the airframe. The Six-Degree-of-Freedom (6DOF) pylon was developed and disclosed by Halwes in the early 1980s and consisted of six vibration-isolator links that successfully provided very low vibration on a demonstrator aircraft. The links are arranged in a statically determinant manner, so that steady loads, including torque, are carried through the six links.

FIGS. 2 through 5 show prior-art pylon 6DOF assemblies having six links, at least some of the links having Halwes isolators. FIGS. 2 and 3 show oblique and top views, respectively, of pylon 35, which has a configuration of six links 17 that are attached in pairs to a transmission 37. An inner rod end 33a of each link 17 is attached to transmission 13 at one of three mounting points 39a, 39b, 39c, which are located approximately equidistant from each other about the periphery of transmission 13. Outer rod end 33b of each link 17 is attached at one of three mounting points 41a, 41b, 41c located approximately equidistant from each other on an airframe.

FIGS. 4 and 5 show oblique and top views, respectively, of pylon 43, which has a configuration of six links 17 that are attached in pairs to a transmission 45. Inner rod ends 33a of each of two pair of links 17 are attached to one of mounting points 47a, 47b on opposite sides of transmission 45, and a third pair of links 49 is attached to transmission 45 at a mounting point 51 located approximately equidistant from mounting points 47a, 47b. Each outer rod end 33b is attached to an airframe at a mounting point 53a, 53b, 53c, 53d. Each link 49 has an inner rod end 55a attached to mounting point 51 and an outer rod end 55b attached to one of mounting points 53c, 53d. Links 49 have a shorter length than links 17, but links 49 also have integral Halwes isolators 56 and operate in the same manner as links 17.

Because each link 17, 49 has a rod end 33a, 33b or 55a, 55b on each end, such that each link 17, 49 can only transmit loads along its axis, attenuating the axial vibration traveling through each link 17, 49 results in dramatic reduction of vibration transmitted through the links into the airframe. However, the 6DOF pylon mounting is a "soft" mounting that allows movement of the pylon, requiring 1) high performance drive shaft couplings to handle misalignments of the engine and transmission, 2) decoupled controls to prevent unintended flight control inputs, and 3) clearance to allow for motion of the pylon.

SUMMARY OF THE INVENTION

There is a need for a vibration-attenuating, hard-mounted pylon for an aircraft and for an active, vibration-attenuating mounting link configured for use therewith.

Therefore, it is an object of the present invention to provide a vibration attenuating, hard-mounted pylon for an aircraft and for an active, vibration-attenuating mounting link configured for use therewith.

A preferred embodiment of a pylon has six pylon mounting links for mounting the pylon to an airframe. Each link is considered "near-rigid" and has a spherical-bearing rod-end on both ends such that the link can only transmit axial loads. At least one of the links has a mass carried within the link and selectively moveable by an actuating means along the axis of the link in an oscillatory manner for attenuating vibrations traveling axially through the link. The actuating means may be an electromechanical, hydraulic, pneumatic, or piezoelectric system. By mounting each link in a selected orientation relative to the other links, the actuating means may be operated in a manner that attenuates axial vibration that would otherwise be transmitted through the link and into the airframe.

The present invention provides for several advantages, including: (1) active vibration attenuation for various frequency ranges; (2) the ability to use low-complexity connections, such as basic driveshaft couplings, to attach the pylon to other components; and (3) the ability to use transmission-mounted equipment, such as air-conditioner compressors.

BRIEF DESCRIPTION OF THE DRAWINGS

For a more complete understanding of the present invention, including its features and advantages, reference is now made to the detailed description of the invention taken in conjunction with the accompanying drawings in which like numerals identify like parts, and in which:

FIG. 6 is a side view of the preferred embodiment of a mounting link according to the invention and used in pylons according to the invention, a portion of the link being cutaway;

FIG. 7 is a side view of an alternative embodiment of a mounting link according to the invention and used in pylons according to the invention, a portion of the link being cutaway;

DESCRIPTION OF THE PREFERRED EMBODIMENT

Figure 1:
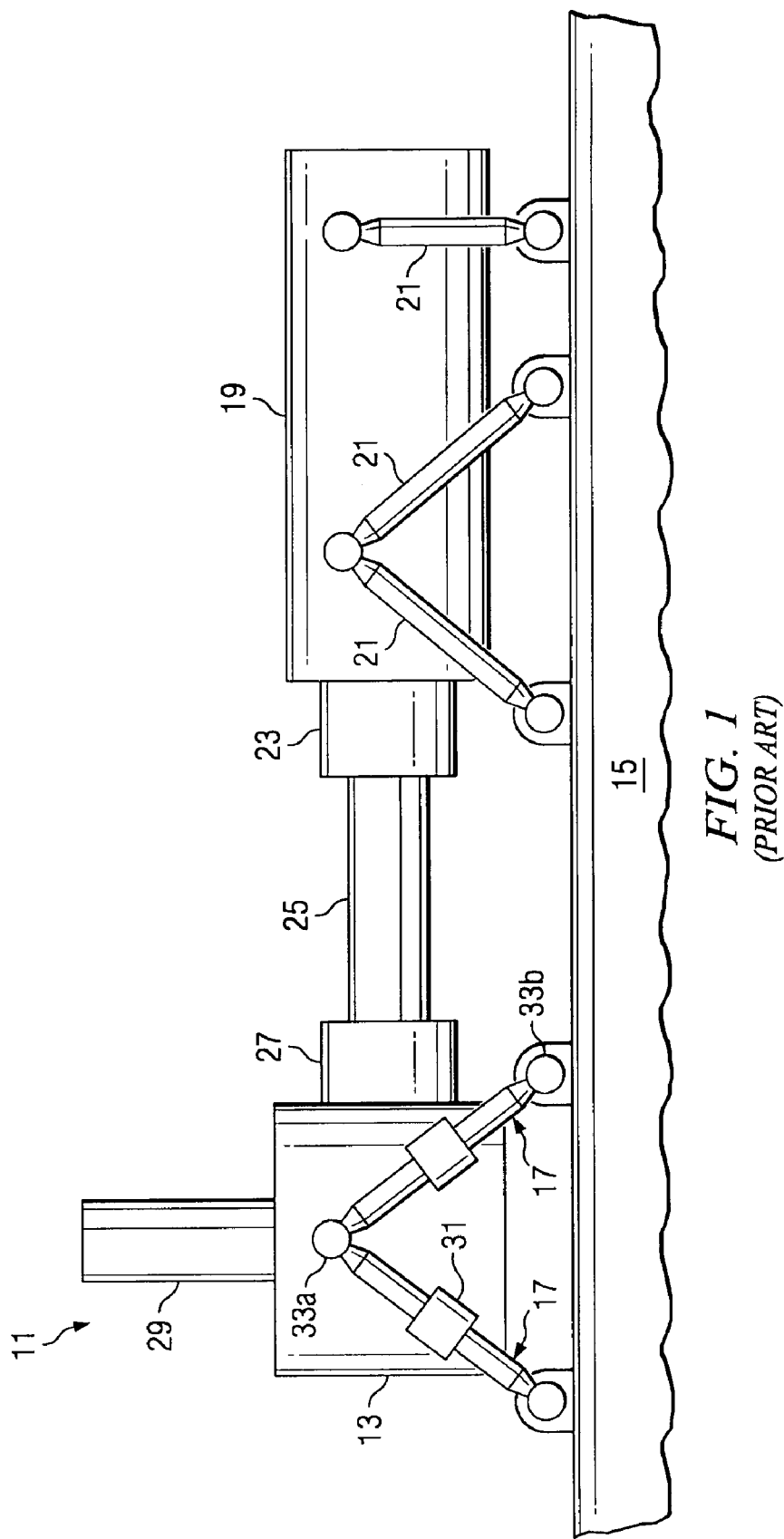
FIG. 1 is a schematic side view of a prior-art pylon and engine mounted on a frame of an aircraft.
Figure 2:
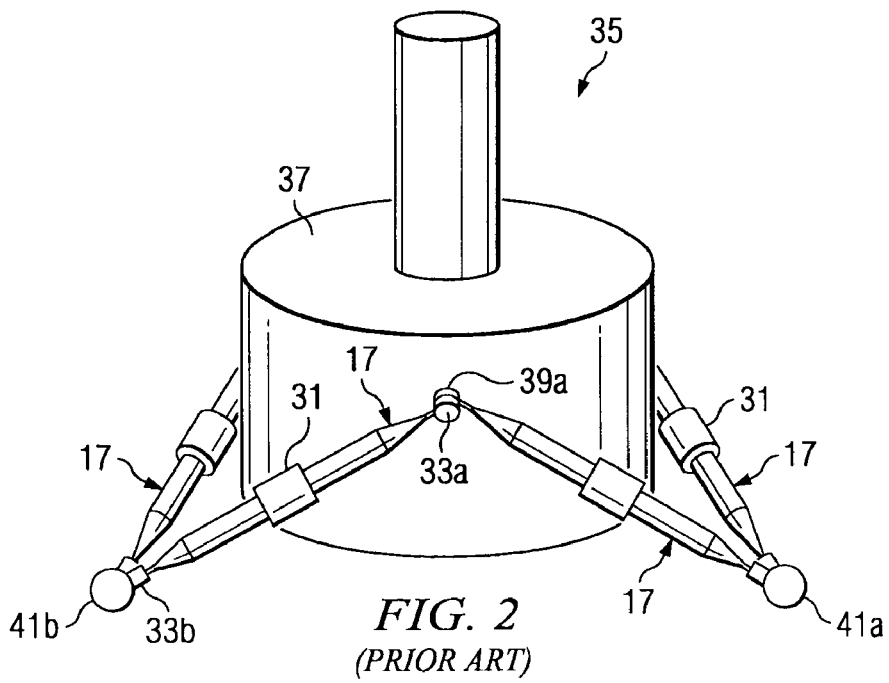
FIG. 2 is an oblique view of a prior-art pylon and mounting configuration.
Figure 3:
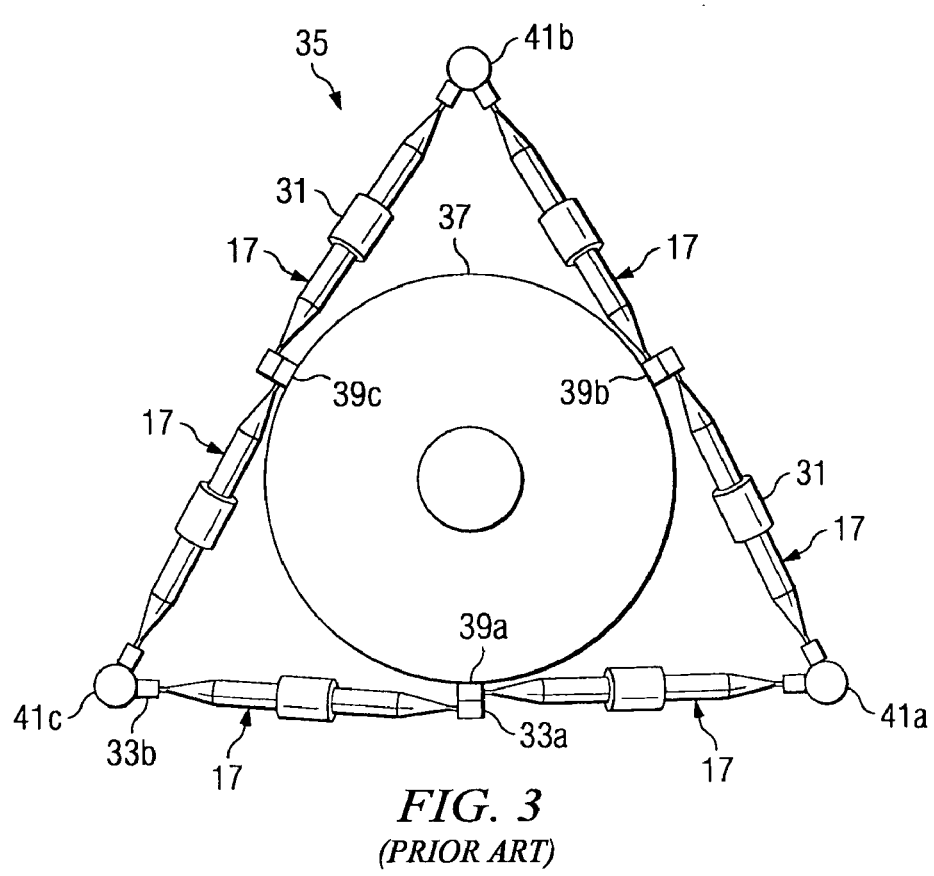
FIG. 3 is a top view of the prior-art pylon and mounting configuration of FIG. 2.
Figure 4:
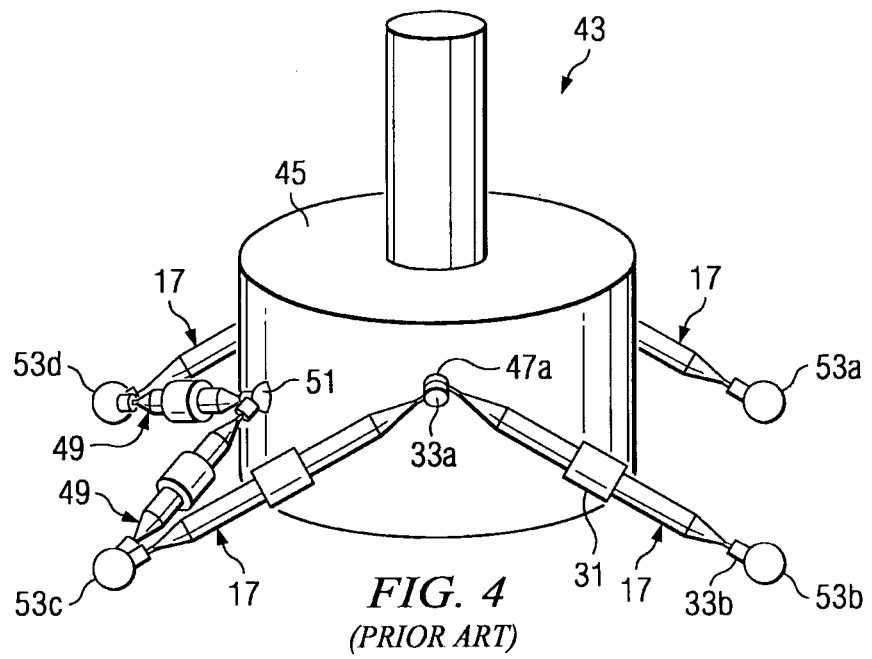
FIG. 4 is an oblique view of a prior-art pylon and mounting configuration.
Figure 5:
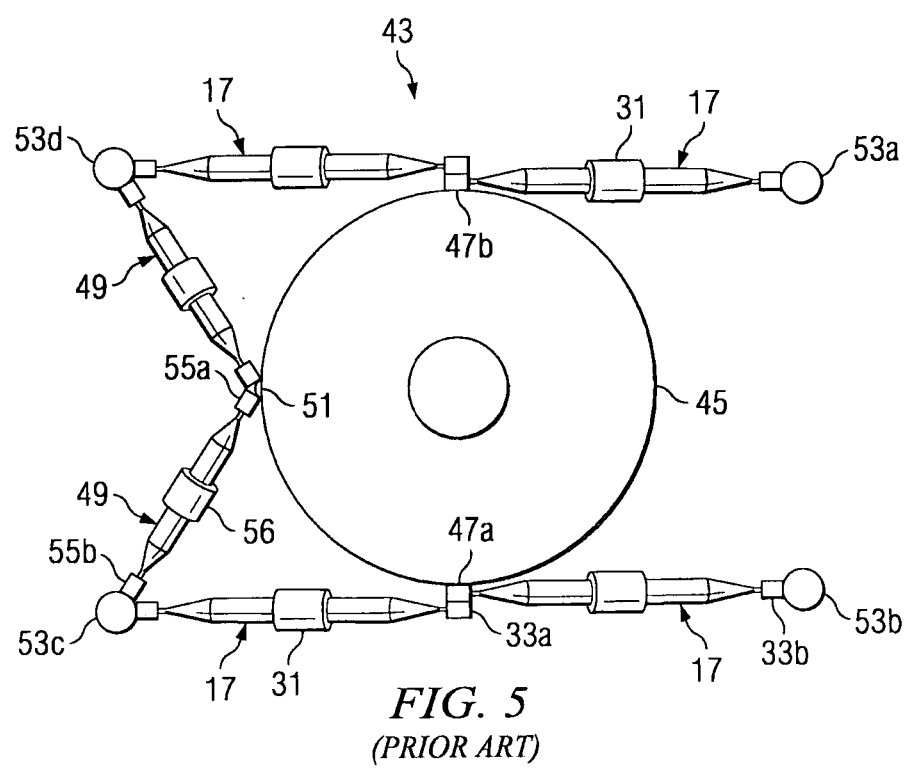
FIG. 5 is a top view of the prior-art pylon and mounting configuration of FIG. 4.

The present invention is directed to a pylon mounting configuration using vibration-attenuating links, the invention being particularly useful with rotary-wing aircraft. The preferred embodiment is a configuration in which a pylon is hard-mounted to the aircraft using multiple links to limit movement of the pylon and to provide for active, tunable vibration treatment as the speed of rotation of the rotor changes. The invention could be used on all rotorcraft to reduce vibration transmitted from the pylon to the fuselage or from the fuselage to sensitive avionics, sight systems, or occupant seating systems. The invention also includes a vibration-attenuation system for controlling the operation of the links of the pylon.

The pylon configuration of the invention substitutes six links having embedded oscillatory vibration attenuators for the links having Halwes fluid isolators in the Six Degree of Freedom (6DOF) pylon mounting arrangement. The attenuators of the invention are designed to be smaller and carried within each link. Oriented thus, they can attenuate the axial vibration that would otherwise be transmitted through the link and into the attached structure. Further, the links are considered "near-rigid," so the pylon motion is reduced dramatically from that allowed by a configuration using the Halwes isolators. Reducing movement of the pylon allows for the use of simple drive shaft couplings (e.g., Thomas couplings) and transmission-mounted equipment such as air-conditioner compressors.

FIGS. 6 and 7 show example embodiments of the links according to the invention. FIG. 6 is a side view of a link 57, with a portion of link 57 shown in cutaway. Link 57 comprises an elongated cylindrical body 59 having spherical-bearing rod ends 61a, 61b at opposite ends of body 59, such that link 57 can only carry loads directed along its longitudinal axis. Body 59 encloses an open volume 63, and a mass 65 is moveably carried within volume 63. Mass 65 is moveably carried on, and coaxial with, a voice-coil actuator 67, which comprises wire 69 coiled about a rod 71. Rod 71 is fixedly attached within body 59. Wire 69 is conductively connected to wire leads 73 for connection to an electrical power source. Mass 65 is formed of a magnetic material and/or carries permanent magnets thereon.

In operation, when an electrical current is supplied to leads 73, the current passes through wire 69 and creates a magnetic field, which causes movement of mass 65 within volume 63 and along the longitudinal axis of link 57. Oscillating the direction of current flow in wire 69 causes mass 65 to move in an oscillatory manner. The oscillatory force created through oscillation of mass 65 may be used to counterbalance vibration traveling through link 57.

FIG. 7 is a side view of an alternative embodiment of a link according to the invention and including inertial devices for attenuating vibration traveling through the links. Link 75, shown with a portion of link 75 in cutaway, comprises an elongated cylindrical body 77 having spherical-bearing rod ends 79a, 79b at opposite ends of body 77, such that link 75 can only carry loads directed along its longitudinal axis. Body 77 encloses an open volume 81, which is divided into two fluid chambers 83a, 83b, and a mass 85 is moveably carried within volume 63. Mass 83 acts as a piston within volume 81 and is sealed to an inner surface 87 of volume 81 with seals 89 near the ends of mass 85. Hydraulic fluid lines 91, 93 are in fluid communication with fluid chambers 83a, 83b, respectively, for providing fluid pressure to fluid chambers 83a, 83b. A fluid line 95 communicates fluid chambers 83a, 83b for allowing fluid to pass from one chamber 83a, 83b to another of chambers 83a, 83b. A valve 97 may be used to control the flow of fluid through fluid line 95.

When fluid pressure is supplied through one of lines 91, 93, the fluid pressure in the associated fluid chamber 83a, 83b acts on the adjacent surface area of mass 85 and urges mass 85 toward the other of chambers 83a, 83b along the longitudinal axis of link 75. Applying pressure to chambers 83a, 83b in an oscillating manner causes mass 85 to move in an oscillatory manner. The oscillatory force created through oscillation of mass 85 may be used to counterbalance vibration traveling through link 75.

While links according to the invention are shown as having electromechanical (link 57) and hydraulic (link 75) actuating means in the inertial device, it should be understood that other means may be used, including, for example, pneumatic and piezoelectric means.

Figure 8:
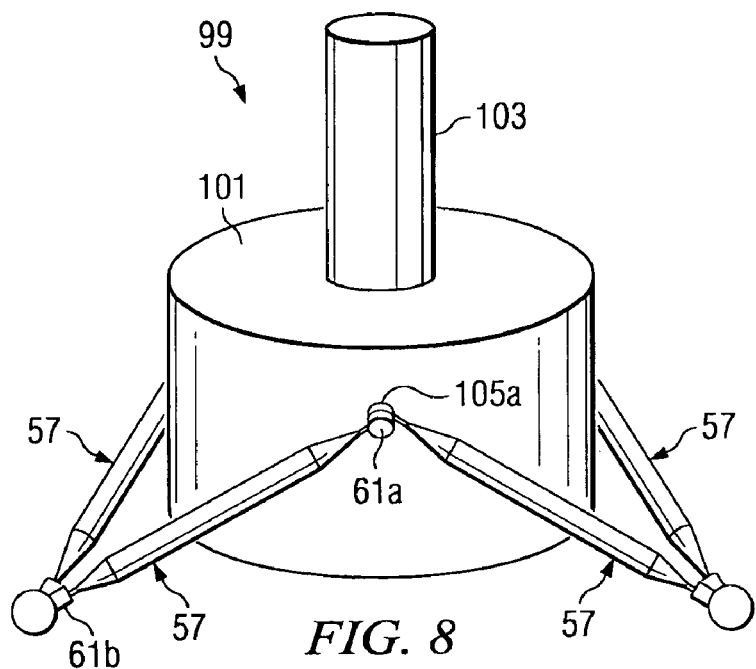
FIG. 8 is an oblique view of a preferred embodiment of a pylon and mounting configuration according to the present invention, the pylon mount comprising links according to the invention.
Figure 9:
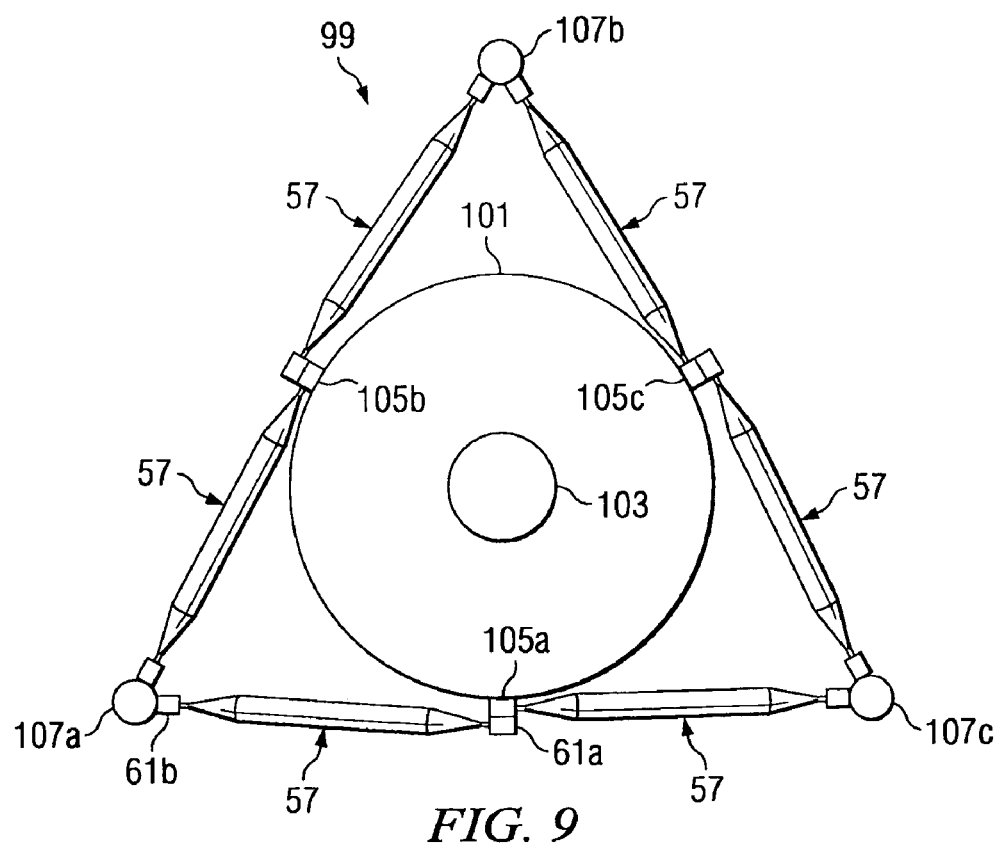
FIG. 9 is a top view of the pylon and mounting configuration of FIG. 8.

FIGS. 8 and 9 show oblique and top views, respectively, of a preferred embodiment of a "hard-mounted" pylon according to the present invention and using links according to the invention. Pylon 99 comprises transmission 101 and mast 103. In the configuration shown, pylon 99 is configured for mounting to an aircraft using link 57 in a type of 6DOF mounting configuration. An inner rod end 61a of each link 57 is attached to transmission 101 at one of three mounting points 105a, 105b, 105c, which are located approximately equidistant from each other about the periphery of transmission 101. Outer rod end 61b of each link 57 is attached at one of three mounting points 41a, 41b, 41c located approximately equidistant from each other on an airframe.

Figure 10:
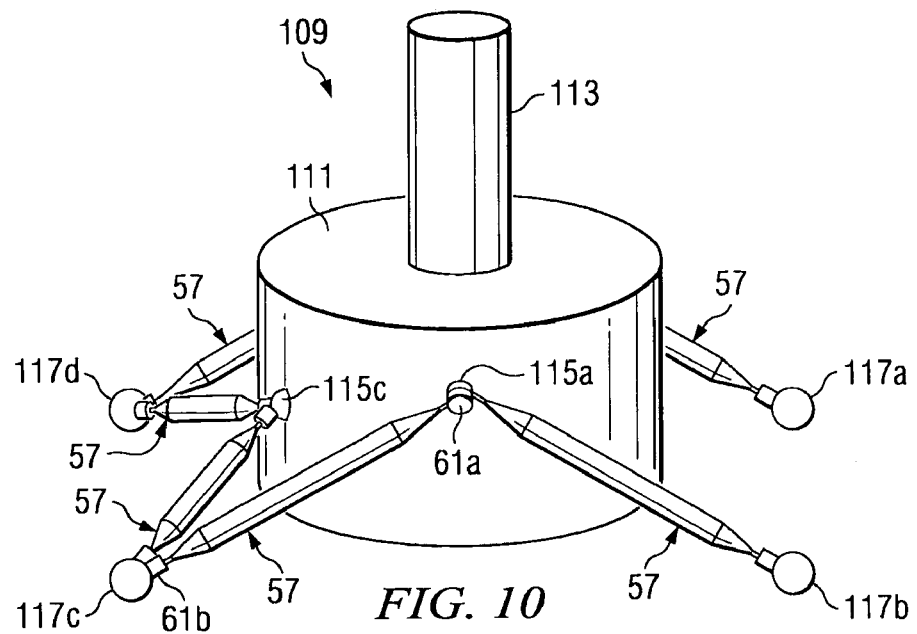
FIG. 10 is an oblique view of an alternative embodiment of a pylon and mounting configuration according to the present invention, the pylon mount comprising links according to the invention.
Figure 11:
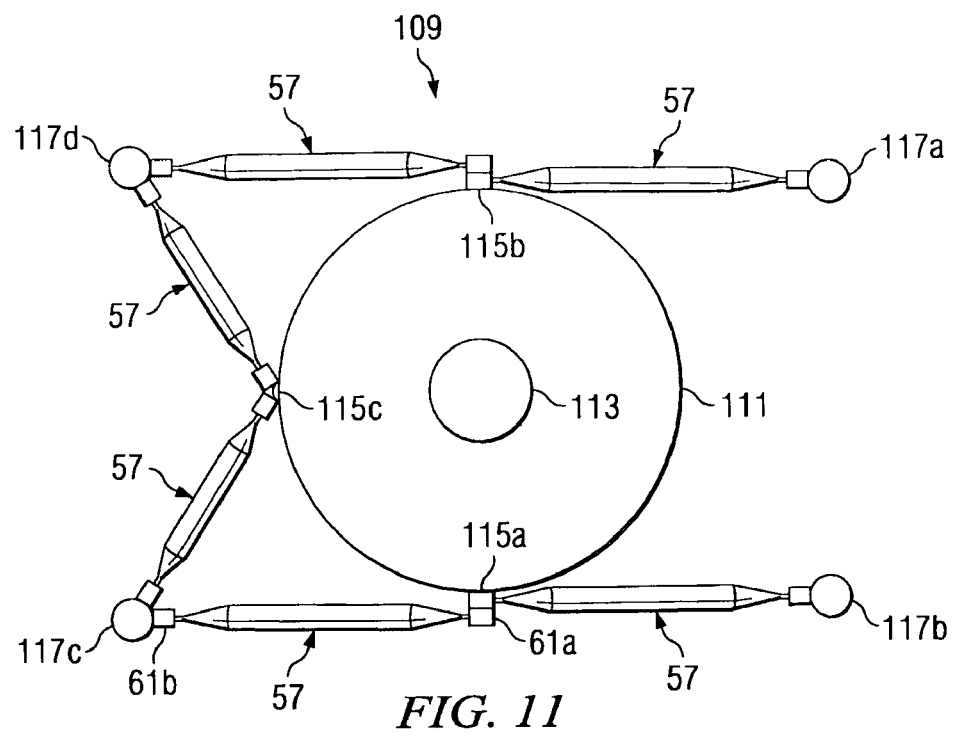
FIG. 11 is a top view of the pylon and mounting configuration of FIG. 10.

FIGS. 10 and 11 show oblique and top views, respectively, of an alternative embodiment of a "hard-mounted" pylon according to the present invention and using links according to the invention. Pylon 109 comprises transmission 111 and mast 113. Inner rod ends 61a of each of two pair of links 57 are attached to one of mounting points 115a, 115b on opposite sides of transmission 111. A third pair of links 57, which are shorter in length than those in the other pairs, is attached to transmission 111 at a mounting point 115c located approximately equidistant from mounting points 115a, 115b. Each outer rod end 61b is attached to an airframe at a mounting point 117a, 117b, 117c, 117d. Outer rod end 61b of each link 57 attached to mounting point 115c is attached to a mounting location 117c, 117d together with one of links 57 in the other pairs of links 57.

Figure 12:
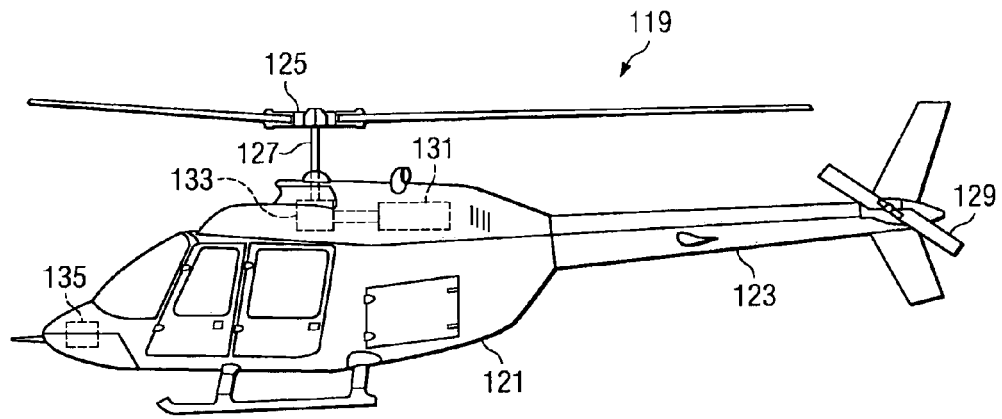
FIG. 12 is a side view of a rotary-wing aircraft having a hard-mounted pylon according to the invention and a vibration-attenuation system according to the invention.

FIG. 12 is a side view of a helicopter having a pylon mounting configuration and vibration control system according to the invention. Helicopter 119 has a fuselage 121 and an empennage 123 extending rearward from fuselage 121. A main rotor 125 is rotated by mast 127 above fuselage 121, and a tail rotor 129 is carried on a rear portion of empennage 123. An engine 131 is mounted within an upper portion of fuselage 121 and produces torque that is transmitted through a transmission 133 to mast 127 for rotating rotor 125. Transmission 133 and mast 127 form a pylon, which is mounted in helicopter 119 using vibration attenuating links, such as links 57, in one of the pylon mounting configurations shown and described above. A computer-based controller 135 for a vibration control system is carried on helicopter 119 for controlling the operation of the actuating means of links 57.

Figure 13:
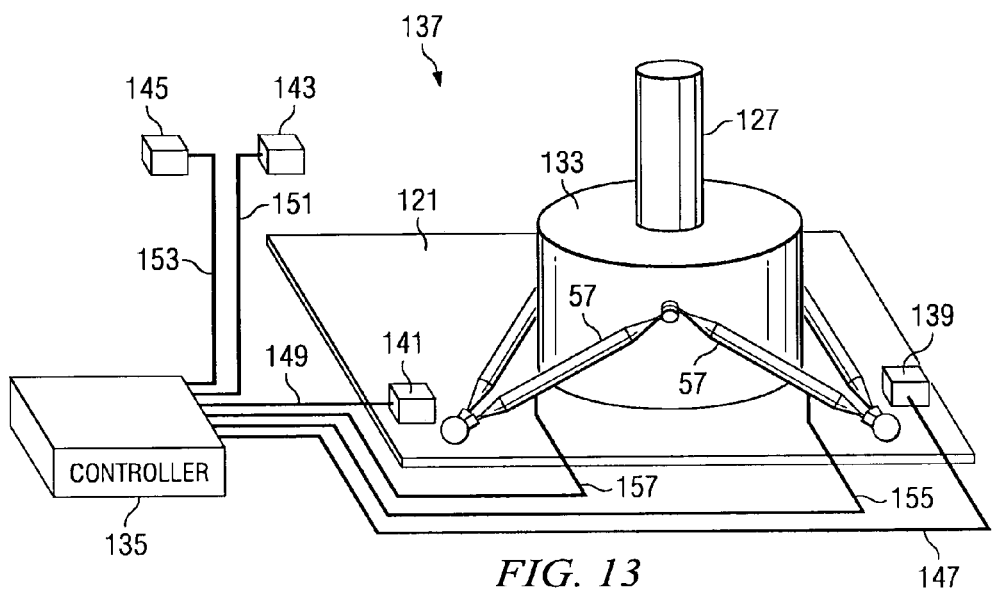
FIG. 13 is a schematic view of a vibration-attenuation system according to the present invention.

FIG. 13 is a schematic view of a vibration control system 137 according to the present invention. Transmission 133 is mounted to fuselage 121 with six vibration-attenuating links 57. A vibration sensor 139, 141 is located near the outer end of each link 57 for sensing vibrations that are transmitted through links 57 to fuselage 121. In addition, vibration sensors 143, 145 may be located in other areas of helicopter 119 for sensing vibrations in selected areas, such as an occupant area, or in sensitive equipment. Sensors 143, 145 may also be used to sense vibration entering fuselage 121 from empennage 123. Data cables 147, 149, 151, 153 communicate data between controller 135 and vibration sensors 139, 141, 143, 145, respectively. Cables 155, 157 communicate operating commands and/or data between controller 135 and links 57. For ease of illustration, only two links 57 are shown as being in communication with controller 135. However, in the preferred embodiment all links 57 are operated using at least one controller 135. It should also be noted that system 137 may use more or fewer vibration sensors.

In operation, vibration sensors 139, 141, 143, 145 sense vibration in the structures to which they are attached and communicate the vibration data to controller 135. Controller 135 uses the vibration data and a vibration-attenuation algorithm to calculate the frequency and amount of force required to attenuate the sensed vibrations to a selected degree of attenuation. This attenuation may be a percentage reduction in the sensed vibrations or may be a reduction of the sensed vibrations to a selected level. To attenuate the vibrations, controller 135 commands the actuating means of each link 57 to move the internal mass at a selected frequency, acceleration, and/or distance traveled by the mass within each link 57. Controller 135 may control the operation of links 57 individually or in combinations of two or more links 57.

The present invention provides for several advantages, including: (1) active vibration attenuation for various frequency ranges; (2) the ability to use low-complexity connections, such as basic driveshaft couplings, to attach the pylon to other components; and (3) the ability to use transmission-mounted equipment, such as air-conditioner compressors.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

The invention claimed is:

1. A vibration-attenuating link for mounting a pylon on an aircraft, the link comprising:

a singular rigid body having opposing ends pivotally connected to both the pylon and a rigid structure of the aircraft, the rigid body enclosing an interior volume;

a first volume and a second volume, the first volume and the second volume being at least partly defined by an interior surface within the interior volume of the rigid body;

a mass separating the first volume and the second volume, the mass being configured as a piston such that the mass is moveably sealed to the inner surface of the rigid body;

a first fluid line in fluid communication with the first volume;

a second fluid line in fluid communication with the second volume;

a third fluid line in fluid communication only with the first and the second volume; and a fluid disposed in the first volume, the second volume, the first fluid line, and the second fluid line;

wherein the mass is moveably carried and translates within the interior volume of the rigid body in communication with the inner surface in response to commands by a controller, the controller being configured to move the mass in an oscillatory manner so as to create oscillatory forces;

wherein the oscillatory forces react against vibratory forces transferred into the body.

2. The link according to claim 1, wherein the body is cylindrical.

3. The link according to claim 1, wherein the oscillatory forces react against the vibratory forces approximate the first fluid chamber and the second fluid chamber.

4. The link according to claim 1, further comprising:

a valve in at least one of the first fluid line and the second fluid line.

5. The link according to claim 1, wherein the controller alternately applies fluid pressure to the first volume through the first fluid line and the second volume through the second fluid line so as to move the mass in an oscillatory manner so as to create oscillatory forces; and wherein the flow of fluid through the third fluid line is controlled by a valve.

* * * * *